United States Patent [19]
Loebig

[11] Patent Number: 5,442,647
[45] Date of Patent: Aug. 15, 1995

[54] METHOD FOR ON-LINE MONITORING AND BIT ERROR REDUCTION FOR THROUGH-CONNECTED CALLS IN DIGITAL COMMUNICATION SYSTEMS

[75] Inventor: Norbert Loebig, Darmstadt, Germany

[73] Assignee: Siemens Aktiegesellschaft, Munich, Germany

[21] Appl. No.: 64,897

[22] Filed: May 24, 1993

[30] Foreign Application Priority Data

Jun. 1, 1992 [DE] Germany .................. 42 18 054.6

[51] Int. Cl.$^6$ .............................................. G06F 11/10
[52] U.S. Cl. ............................... 371/53; 370/13; 370/14; 371/48; 371/49.1
[58] Field of Search ................. 371/53, 48, 49.1, 49.2, 371/67.1, 68.2; 370/13, 14, 60, 63

[56] References Cited

U.S. PATENT DOCUMENTS

| | | | |
|---|---|---|---|
| 4,345,324 | 8/1982 | Smitt ........................... | 370/14 |
| 4,535,442 | 8/1985 | Maddern et al. ............ | 370/13 |
| 4,821,256 | 4/1989 | Schmidt et al. ............. | 370/13 |
| 5,249,292 | 9/1993 | Chiappa ...................... | 395/650 |

FOREIGN PATENT DOCUMENTS

| | | |
|---|---|---|
| 0384936 | 4/1990 | European Pat. Off. . |
| 2427668 | 1/1975 | Germany . |
| 8402439 | 6/1984 | WIPO . |

*Primary Examiner*—Robert W. Beausoliel, Jr.
*Assistant Examiner*—Phung M. Chung
*Attorney, Agent, or Firm*—Hill, Steadman & Simpson

[57] ABSTRACT

Bit falsifications occur in the switching networks of digital communication systems in the transmission through these switching networks of bit streams composed of a plurality of information words. By correcting these bit errors, only a correctly transmitted information word is forwarded to a destination subscriber after the transmission given redundantly executed and activated switching network halves. Whether an information word was correctly transmission is determined after the transmission with a combined parity bit check as well as bit-by-bit comparison to the information word transmission in parallel. It is assured that bit falsifications of the units (holding memories) participating in the transmission process are detected and corrected.

20 Claims, 3 Drawing Sheets

| | | |
|---|---|---|
| P(0) | 0 | I(0) |
| P(1) | 0 | I(1) |
| P(2) | 0 | I(2) |
| P(3) | 0 | I(3) |
| P(4) | 1 | I(4) |
| P(5) | 1 | I(5) |
| P(6) | 0 | I(6) |
| P(7) | 0 | I(7) |
| ⋮ | 0 | ⋮ |
| P(10) | 0 | I(10) |
| P(11) | 1 | I(11) |
| P(12) | 1 | I(12) |
| P(13) | 0 | I(13) |
| P(14) | 0 | I(14) |

SN0: $I^{(0)}\ldots\ldots I^{(N)}$ $Q_1 = 110$ $Q_1 = 110$ (rows 4–6)

$Q_1 = 110$ (rows 11–13)

FIG 2b

| | | |
|---|---|---|
| P(0) | 0 | J(0) |
| P(1) | 0 | J(1) |
| P(2) | 0 | J(2) |
| P(3) | 0 | J(3) |
| P(4) | 1 | J(4) |
| P(5) | 1 | J(5) |
| P(6) | 1 | J(6) |
| P(7) | 0 | J(7) |
| ⋮ | 0 | ⋮ |
| P(10) | 0 | J(10) |
| P(11) | 1 | J(11) |
| P(12) | 1 | J(12) |
| P(13) | 1 | J(13) |
| P(14) | 0 | J(14) |

SN1: $J^{(L)}\ldots\ldots J^{(K)}$ $Q_2 = 111$ $Q_2 = 111$ (rows 4–6)

$Q_2 = 111$ (rows 11–13)

Q = 110 IN DIU (B)    OUTPUT: $I^{(0)}\ldots I^{(N)}$

FIG 3

METHOD FOR ON-LINE MONITORING AND BIT ERROR REDUCTION FOR THROUGH-CONNECTED CALLS IN DIGITAL COMMUNICATION SYSTEMS

BACKGROUND OF THE INVENTION

Data transmission on lines and cables is subjected to disturbing influences such as, for example, electromagnetic fields that modify the information to be transmitted in that, for example, one or more bits are "turned around" during the transmission. Since it is particularly international long-distance calls that are susceptible to bit errors, international standardization committees (such as, for example, CCITT) have defined minimum rules for bit error rates. Optical transmission links are considerably less subject to external influences, so that the transmission reliability is extremely high given the employment of optical transmission links.

In general, every transmission link is composed of a total of two parts. One part relates to the transmission of information over a physical path between two nodes. These paths are being increasingly realized with optical message cables. The other part relates to the through-connection of the information in the respective nodes in which communication systems are installed.

The potential disturbing influence in the transmission-oriented part has been decisively reduced by employing optical transmission systems, whereas frequent errors in comparison thereto occur in the through-connection events in the switching networks of the communication systems.

As a consequence of their central significance for the communication systems, the switching networks are usually redundantly or even multiply implemented. This makes it possible to through-connect the information over a different switching network level given a malfunction of one switching network level. First, this ensues that one switching network level is in a quiescent condition while the other switching network level implements the current through-connection of the information; second, however, both switching network levels can also actively through-connect the corresponding information.

In order to be able to through-connect information over the respective switching network levels, the through-connect route in the switching network must be previously defined and set. This means that the information that arrives at the switching network and that is to be through-connected enters into the switching network via an input that is generally already determined, or that must be first determined before the through-connect event. This information leaves the switching network via an output that is also to be determined. The determination as to which input/output is employed in the through-connection of an information stream composed of a plurality of information words occurs by evaluating the signalling information with the central control platform of the communication system that defines and sets the through-connect route through the switching network. What is generally understood by a central control platform is the interplay of the central and decentralized control units of a communication system. The central control platform has stored therein the current data about the momentary occupation of the inputs/outputs of the entire switching network as well as the routes employed. The central control platform can therefore allocate as yet unoccupied input/outputs as well as corresponding through-connect routes through the switching network to further information streams to be through-connected. The central control platform makes this allocation at any time. A potential abort or the termination of an existing call is likewise implemented by the central control platform. This leads to the release of occupied inputs/outputs as well as used through-connect routes. Consequently, the data connected therewith must be constantly serviced by the central control platform, i.e. must be updated as needed. Since these are a matter of dynamically changing data, the servicing occurs in the memory of the central control platform. Storage on an external storage medium such as, for example, a hard disk is not possible because of the long access time connected therewith.

Sporadic and permanent errors can occur (bit error rate) upon through-connection of information across a switching network level. These are usually expressed therein that individual bits or a plurality of bits are falsified during the through-connect event, an inadmissible bit error rate arises or a false information stream is even output. Temporary or lasting false output can be the result. Sporadic errors originate in electromagnetic interference, in thermal influences or aging component parts, whereas permanently appearing errors result from defective or falsified holding memory areas, defective voice memories, defective addressing logics for holding and voice memories, from defective or superannuated component parts (for example lasers) or from a defective power supply.

In general, such errors are difficult to analyze and to eliminate insofar as they have no influence whatsoever on the function of the switching network as a through-connect unit. Prior art error recognition methods for recognizing and correcting bit errors in switching network have been realized, for example, in the form of on-line monitoring. German Published Application 24 27 668 discloses such a method. Additional check information is attached to the information words per channel that shape the information, being attached thereto before the actual through-connect event in the switching network. The check information, for example, can be a parity bit. What is thereby understood is the binary checksum over the individual bits of the corresponding information word. After the through-connect even, a binary checksum of the through-connected information word is again calculated (in the case of the parity bit) and the parity thereof with the transmitted parity bit is compared. When the two deviate from one another, then there is a transmission error that is retained in a corresponding table memory. Statements about the condition of the corresponding switching network level can thus be made over specific time spans. The switching network level that had the lowest bit error rate in the past can be used for the through-connection of the information streams based on these statistical statements.

German Patent Application P 41 28 412.7 (corresponding to U.S. Ser. No. 07/918,079 filed Jul. 24, 1992) also discloses a method for on-line monitoring and bit error reduction. A check information is calculated therein for the information words that form the information, being calculated in peripheral units before the through-connect event. This check information is appended to the respective information word. This is followed by a duplication of the information word supplemented by the check information, as well as by a through-connection over both switching network levels implemented following thereupon. After the through-connect event, the information words supplemented with the check information are subjected to another calculation of check information and the result is compared to the co-transmitted check information. Parallel thereto, the information words themselves are compared to one another bit-by-bit. Conclusions can then be drawn from the two evaluations as to whether or not transmission error is present or as to whether statements (although limited statements) can be made as to which bit was falsified. Corrections can then be implemented in this case. What is problematical about this procedure is that an unambiguous statement is not always possible. In this case, one has recourse to a statistical function f(s) that then forwards the information words to the destination subscriber that were connected via the switching network level that supplied the better statistical quality data in the past. In this case, however, there is a certain probability of the risk that the falsified information word will be forwarded to the destination subscriber.

Further, exact error localizing is only possible to a coarse scope in this method. Although statements can be made about which switching network level caused the transmission errors, a more detailed localization is not possible.

Over and above this, errors that effect a faulty through-connection in the switching network have serious consequences, i.e. that an information stream entering at a specific input of the switching network does not depart the switching network at the intended output but is forwarded to a random destination subscriber via an incorrect output due to a sporadic or permanently occurring error in the setting procedure. Such errors cannot be centerly discovered. Frequently, it is only the destination subscriber who recognizes the faulty through-connection.

Further, the fact that all dynamic setting data are deposited in the memory of the central control platform can lead to problems. For instance, in the case of a total outage of relevant parts of the central control platform, all setting data of the switching network as well as the data of the input/output occupation stored therein are thus lost. Relocation on to an external storage medium such as, for example, a hard disk is not possible since the setting data must be dynamically updated and the write/read procedures on the hard disk would use too much time, particularly in times of high traffic volume. The result of this is that all existing connections are aborted and the appertaining data memories must be initialized or must be updated in a complex way according to the hardware settings.

SUMMARY OF THE INVENTION

It is an object of the present invention to keep the effect of errors as minimum as possible, particularly in view of a faulty through-connection to destination subscribers in switching networks of digital communication systems.

This object is achieved by a method of the present invention for on-line monitoring and bit error reduction for through-connected connections in communication systems having a switching network composed of at least two switching network levels. The method has the following steps:

a) the incoming information words are provided with auxiliary information composed of two sub-information, being provided therewith per information word at interface elements of the input side composed of a plurality of inputs, whereby the first sub-information belongs to a source number that is characteristic of the respective input of the interface elements of the input side;

b) subsequently, the second sub-information is formed from the information words and the first sub-information, and the information words together with the auxiliary information are duplicated and forwarded via a respective switching network level to selected interface elements of the output side;

c) in a first evaluation of the information words as well as the co-transmitted, first sub-information a second sub-information is again formed in the selected interface elements of the output side, this second sub-information being compared to the co-transmitted, second sub-information and a bit-by-bit comparison of the information words and the co-transmitted, first sub-information is implemented in a second evaluation; and d) in cooperation with a central control platform and dependent on the result of the first and second evaluations, the interface elements of the output side respectively forward one of the information words through-connected in parallel to the destination subscriber.

In a first configuration of the check evaluation information the second sub-information is a check bit acquired from a binary checksum of the respective information word and the appertaining sub-information. What is thereby involved is a check bit acquired from a binary checksum. The binary checksum is thereby formed from the information word and from the attached source number bit. However, further check evaluation methods are also conceivable; thus, for example, the binary checksum can be formed, for instance, only with every second bit. Further, the check evaluation can be formed using mathematical functions, such as, for instance, a multiplication or division.

The source number is encoded in a 1-bit information. In order to acquire the complete source number, these bits must therefore be stored and filled until the source number is complete. The source number is a characteristic number for the location where the information stream entered into the communication system. This input location is formed by interface elements at the input side. The through-connect event itself is characterized in that a selected output that is formed by interface elements at the output side is allocated to the respective input location. Since the source number is through-connected together with the information stream, a determination can be made at the interface elements of the output side as to whether the through-connection through the switching network was correct in view of the allocation of input/output.

In a further development of the present invention the through-connection over the switching network level having the better statistical quality data ensures in information-word-oriented fashion in case the combination of the first and second evaluation does not supply an error allocation.

In a first embodiment of the present invention the source number is deposited per call setup in the interface elements of the output side by the central control platform via a communication channel. Given a noncoincidence of the source numbers through-connected via both switching network levels in a second evaluation, the interface elements of the output side, using the deposited source numbers, forward the information stream in the direction of the destination subscriber whose co-transmitted source number is identical to that deposited in the interface elements of the output side. It is provided that the source number in the call setup is deposited in the interface elements of the output side via a communication channel between the central control platform and interface element. When the information streams supplied by the two switching network levels are different and contain different source numbers, the interface elements of the output side can independently select and output the correctly through-connected information stream.

In a second embodiment of the present invention, given a non-coincidence of the source numbers identified in the second evaluation, a message is sent from the interface elements of the output side to the central control platform which initiates the latter to use the internally stored source numbers belonging to the information stream as an additional criterion to determine which of the two through-connected, non-coincident information streams or, respectively, source numbers is correct. The result is communicated to the interface elements of the output side for the selection of the correct information stream. It is provided that a message is transmitted from the interface elements of the output side to the central control platform in case of a permanent inequality of the information streams delivered by the respective switching network levels as well as in case of a non-coincidence of the appertaining source numbers. With reference to its internally stored connection data and the information about destination number and source numbers contained in the message, this control platform decides which of the information streams through-connected to the interface element was correctly transmitted and communicates the result to the interface elements of the output side.

In a third embodiment of the present invention the source/destination relations stored in the central control platform that define the setting data of the switching network are cyclically transmitted to the interface elements of the output side in the form of the source numbers via a communication channel by a transmission procedure. The latter are used for deciding in case of a non-coincidence of the source numbers identified in the second evaluation as to which of the two, non-coincidence source numbers is correct and thus, which information stream is to be forward in the direction to the destination subscriber as soon as the source number deposited by the communication channel coincides with one of those transmitted in the two switching network levels. A transmission procedure cyclically transmits the source numbers stored in the central control platform to the respective interface elements of the output side. In case of a permanent discrepancy of the through-connected information streams, the latter can thus decide themselves what information streams were correctly transmitted. Such a procedure combines "dynamic" points of view with a fast reaction in case of error.

In an application of the present invention to asynchronously set switching networks, the second evaluation is only implemented when an adequately long protective time has elapsed. It must thereby be noted that the application of the method of the present invention only occurs after an adequately long protective time, since only after this time is it assured that both switching network levels are through-connected. Further, the method of the present invention can be applied to individual switching network components of a switching network. Such an embodiment assures that the information streams to be forwarded are already freed of bit errors within the switching network.

What is particularly advantageous about the invention is that the connection data stored at the central control platform can be regenerated after a total outage of the central control platform directly from the source numbers available in the interface elements of the output side, this considerably simplifying the preservation of existing connections.

BRIEF DESCRIPTION OF THE DRAWINGS

The features of the present invention which are believed to be novel, are set forth with particularity in the appended claims. The invention, together with further objects and advantages, may best be understood by reference to the following description taken in conjunction with the accompanying drawings, in the several Figures of which like reference numerals identify like elements, and in which:

DESCRIPTION OF THE PREFERRED EMBODIMENT

Figure 1:
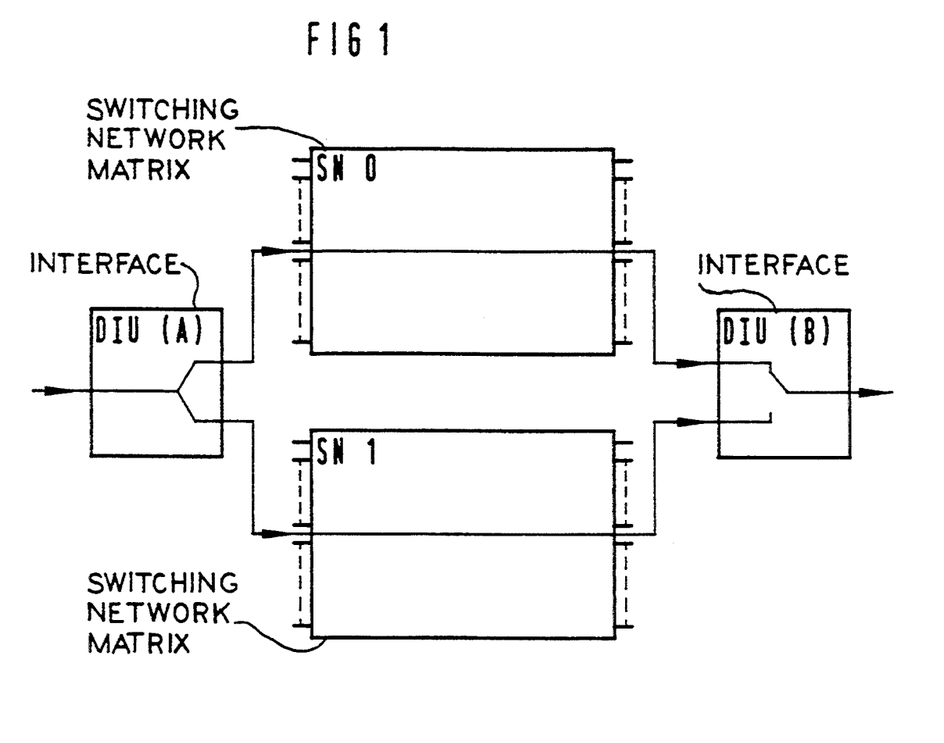
FIG. 1 depicts a switching network of a digital communication system.

FIG. 1 shows a switching network SN of a digital communication system KS. The switching network SN is redundantly designed and is divided into two switching network levels $SN_0$, $SN_1$. The interface elements DIU(A), DIU(B) of the input side and output side, respectively, function as interface between the communication network and the communication system KS.

An information stream penetrating into the communication system KS and composed of a plurality of information words $I^{(o)}...I^{(n)}$ is provided with auxiliary information ZU characteristic for the respective information word $I^{(x)}$ in the interface elements DIU(A) of the input side before the through-connect event through the switching network SN.

In general, a source number Q is permanently allocated to the input of the interface element DIU(A) of the input side at which the information words have been received. By evaluating the signalling information, further, a destination number Z corresponding to the source number Q, i.e. the output from which the information words in turn leave the interface elements DIU(B) of the output side after the through-connect event is calculated. The source number Q as well as the destination number Z are tabularly stored in the central control platform CP. Using these two quantities, the central control platform CP calculates the through-connect route in the switching network SN using a suitable algorithm and sets this through-connect route. The central control platform CP thus determines what route must be used through the switching network SN for the through-connection of the information stream $I^{(o)}...I^{(n)}$.

It is assumed in the exemplary embodiment that an information word $I^{(x)}$ is composed of 8 bits. In the interface elements DIU(A) of the input side, the incoming information words $I^{(o)}...I^{(n)}$ are first provided with the source number Q permanently allocated to the respective input of the interface elements DIU(A) of the input side, and this is subsequently appended to the information word $I^{(x)}$ as ninth bit bit-by-bit over a plurality of information words. A parity generation via the information word $I^{(x)}$ and the respective source number bit Q subsequently occurs, the result thereof being retained as parity bit P in bit 10. Every information word $I^{(x)}$ is thus provided before the through-connect event with auxiliary information ZU that is two bits wide and is composed of the parity bit P and the source number bit Q. A mirror-symmetrical splitting of the information word $I^{(x)}$ together with the auxiliary information ZU then occurs into two identical structures, whereby each information word $I^{(x)}$ together with its auxiliary information ZU is conducted across the respective switching network level $SN_0$, $SN_1$, taking the through-connect route defined by the central control platform CP into consideration.

Figure 2A:
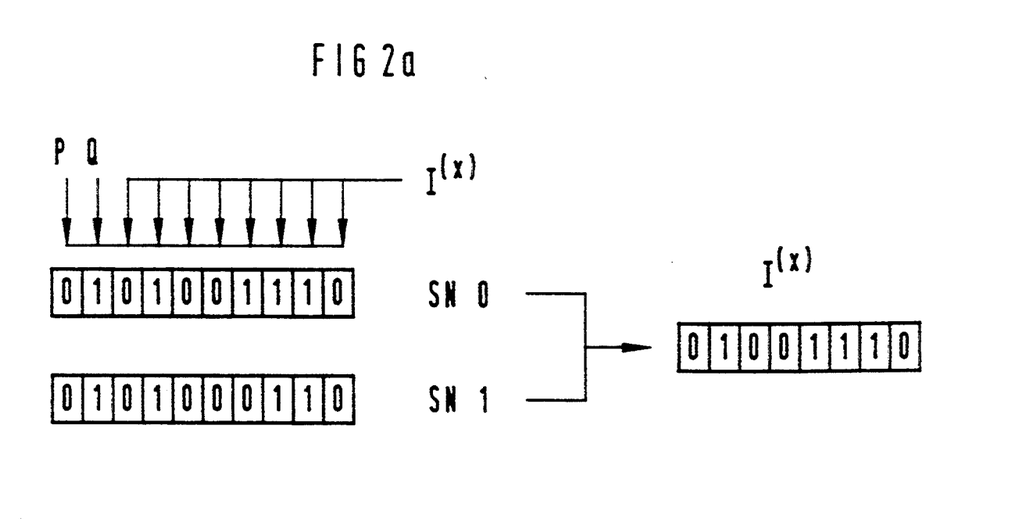
FIG. 2a and 2b depict the method of the present invention.

The procedure of the present invention is disclosed in detail in FIG. 2a.

After the through-connection, the information words $I^{(x)}$ together with their co-transmitted auxiliary information ZU are subjected to another evaluation in the interface elements DIU(B) of the output side. First, another parity check of both through-connected information words $I^{(X)}$ supplemented by the source number bit Q occurs in a first evaluation. The result of this parity check is compared to the co-transmitted parity bit P. In a second evaluation, both through-connected information words $I^{(X)}$ together with the co-transmitted source number bit Q are compared to one another bit-by-bit. A combination of both evaluations allows conclusions about which of the information words $I^{(x)}$ were transmitted falsified. Given non-coincidence of the information words $I^{(x)}$ of both switching network levels $SN_0$, $SN_1$, the information word $I^{(x)}$ that is consistent with respect to its co-transmitted parity information P including the source bit number Q is forwarded to the destination subscriber. In case this condition is not satisfied, the information word $I^{(x)}$ that was conducted across the switching network level having the better statistical quality data is forwarded to the destination subscriber. This statistical quality data are retained in a statistical function f(s).

Figure 2B:
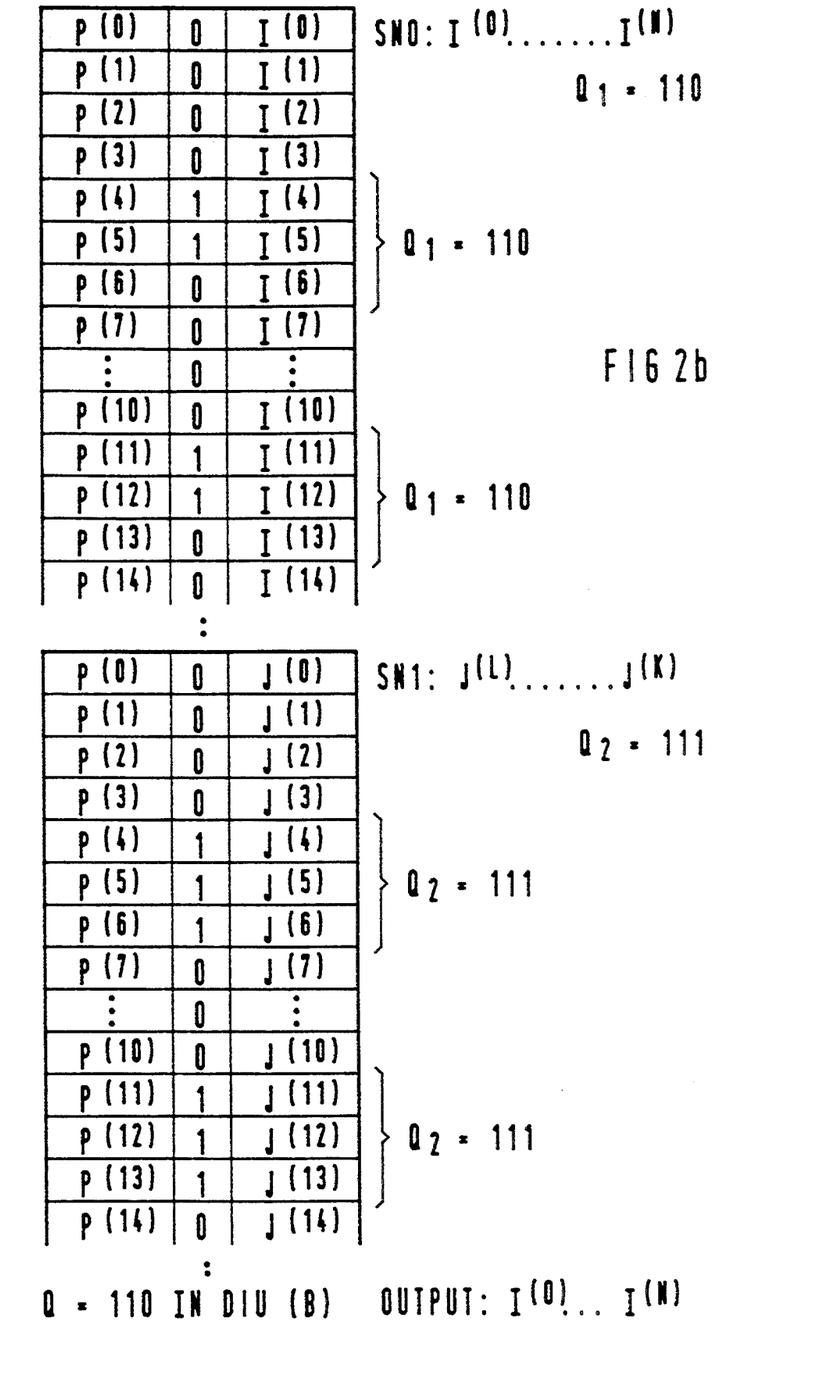

FIG. 2b shows the method of the present invention in case of a discrepancy of the source numbers Q.

It is now assumed in the present exemplary embodiment that an incorrect through-connection is present in a switching network level due to the occurrence of temporary or permanent errors, so that two permanently different information streams $I^{(o)}...I^{(n)}$ and $J^{(l)}...J^{(k)}$ which, however, are inherently consistent with respect to their parity arrive in the interface element DIU(B) of the output side. This can be determined by the bit-by-bit comparison implemented in the second evaluation. It is thus assumed in the present case that the parity generation implemented in the first evaluation allows no conclusions about which of the two information streams $I^{(x)}$ conducted over switching network level $SN_0$ and $SN_1$ was incorrectly transmitted.

A further criterion must now be added for a more precise determination. In a first embodiment of the present invention, the interface elements DIU(B) of the output side are informed of the source numbers Q allocated to the respective outputs, being informed thereof upon utilization of a communication channel between the central control platform and the interface elements DIU(B) of the output side per call set up. The source numbers Q are thus currently deposited in the interface elements DIU(B) of the output side. In the error case set forth above, thus, the interface element DIU(B) of the output side can independently identify and output the correctly through-connected information stream. Error data can be peripherally stored or can be reported to the central control platform CP.

In a further development of the present invention, the interface elements DIU(B) of the output side send a message to the central control platform CP in case of difference between the information streams $I^{(o)}...I^{(n)}$, $J^{(l)}... J^{(k)}$ supplied via both switching network levels $SN_0$, $SN_1$. This message contains the destination number as well as the source numbers Q of the information streams $I^{(o)}...I^{(n)}$, $J^{(l)}...J^{(k)}$ through-connected via both switching network levels $SN_0$, $SN_1$. Using its internally stored connection data, the central control platform CP identifies the appertaining destination numbers for both source numbers Q. A determination can thus be made in a simple way as to which of the two through-connected information streams was correctly transmitted. The result of this evaluation is communicated to the interface elements DIU(B) of the output side from the central control platform CP via a corresponding message for the selection of the correct information stream.

In a third embodiment of the present invention, the source numbers Q stored in the central control platform CP are cyclically transmitted by a transmission procedure U to the appertaining interface units DIU(B) of the output side and are stored thereat. An image of the source numbers Q kept in the central control platform CP thus exists in the interface units DIU(B) of the output side. In the error instance being set forth, thus, the interface elements DIU(B) of the output side have a high probability of immediately independently deciding which of the two information streams supplied by the two switching network levels $SN_0$, $SN_1$ is to be forwarded to the destination subscriber. This procedure is extremely advantageous for digital communication systems, both from dynamic points of view as well from the aspect of immediate error elimination, since the decision process can be largely decentrally accomplished without interruption of other software processes and without simultaneously making high demands of the processor dynamics of the central control platform CP.

In case of the total outage of relevant parts of the central control platform CP, the connection data stored therein is lost. As a result of the method of the present invention, the source numbers Q present in the interface units DIU(B) of the output side are available for updating the connection data of the central control platform CP. In practice, this means that the central control platform CP can be very quickly placed back in operation without thereby interrupting existing connections.

The method of the present invention can also be applied to asynchronously set switching network levels. They are characterized in that the through-connection of information streams over the respective switching network levels occurs at different times and momentary information streams from various sources thus pend in the interface elements DIU(B) of the output side. It is to be noted that an adequately long protective time must be established wherein the differences between the information streams conducted over both switching network levels $SN_0$, $SN_1$ do not produce any error reaction in the interface elements DIU(B) of the output side. The method of the present invention can be implemented only after the expiration of this protective time.

Figure 3:
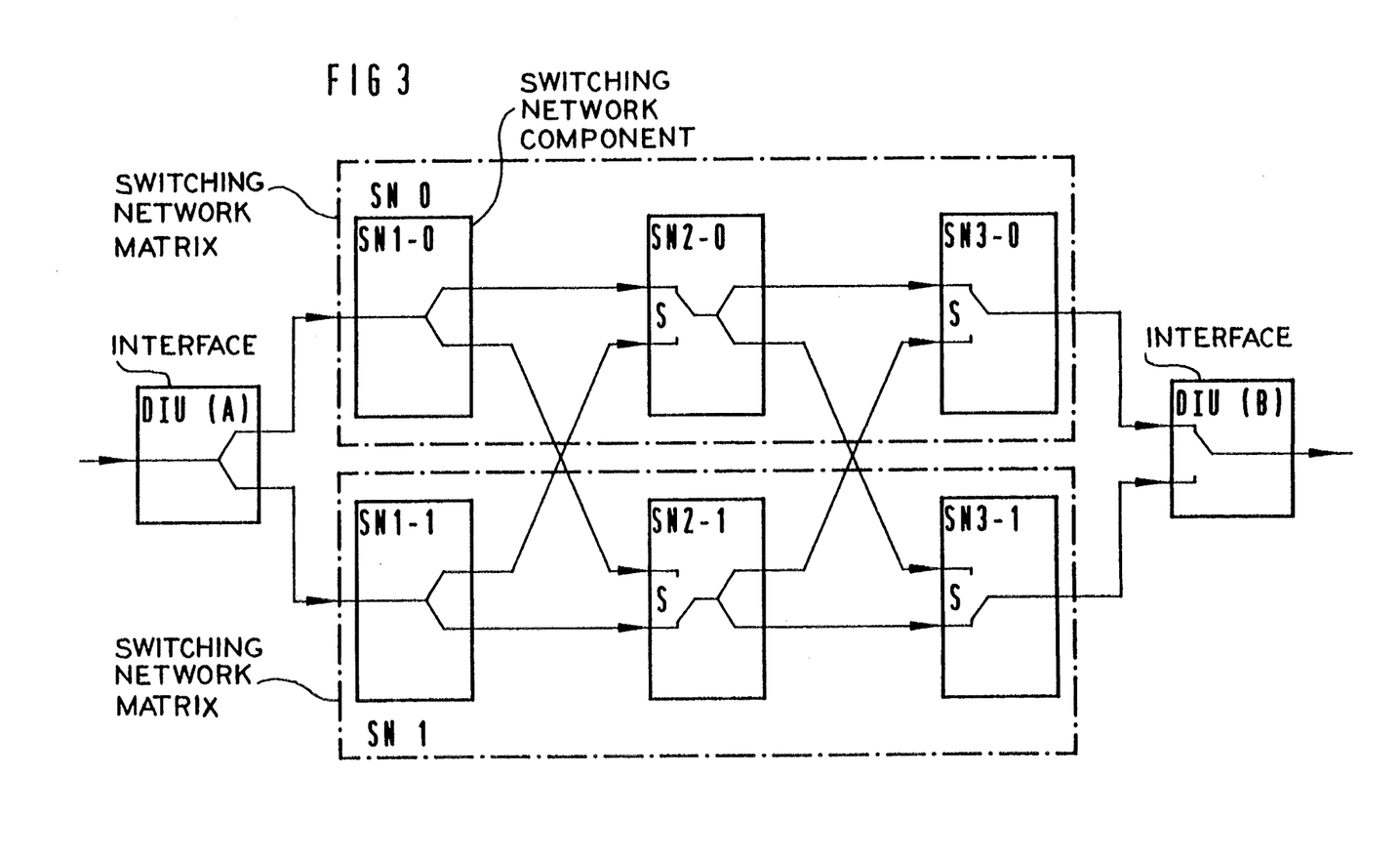
FIG. 3 depicts the FIG. 1 switching network in more detail.

FIG. 3 shows the switching network SN known from FIG. 1 with the switching network levels $SN_0$, $SN_1$ as well as the interface elements DIU((A), DIU(B) of the input side or, respectively, output side in greater detail.

One switching network level $SN_0$, $SN_1$ is thereby composed of a plurality of switching network components, three in the present exemplary embodiment. These are the switching network components $SN_{1-0}$, $SN_{2-0}$, $SN_{3-0}$ for the switching network level $SN_0$ and the switching network components $SN_{1-1}$, $SN_{2-1}$, $SN_{3-1}$ for the switching network level $SN_1$. For security reasons, the individual switching network components are cross-connected with one another. This means that the switch units S shown in the respective switching network components can be relocated onto the respective, other switching network components in case of a fault.

The method of the present invention can also be applied to the through-connection of information words $I^{(o)}...I^{(n)}$ in individual switching network components. This means that a decision as to which information word $I^{(x)}$ was correctly through-connected over the preceding switching network components $SN_{(x-1)y}$ can already be made in the switching network components $SN_{x-y}(x=2, 3; y=0, 1)$. By evaluating the source number Q in the switching network component $SN_{x-y}$, a determination can also be made in the described way as to where the transmission error occurred. In this case, the error localization could be even more exactly implemented than given application of the method of the present invention to the switching network SN as a whole.

The invention is not limited to the particular details of the method depicted and other modifications and applications are contemplated. Certain other changes may be made in the above described method without departing from the true spirit and scope of the invention herein involved. It is intended, therefore, that the subject matter in the above depiction shall be interpreted as illustrative and not in a limiting sense.

What is claimed is:

1. A method for on-line monitoring and bit error reduction for connections in communication systems having a switching network composed of at least two switching network levels, the switching network having an input side and an output side that is coupled to a destination subscriber, the method comprising the steps of:

providing interface elements at the input side composed of a plurality of inputs and providing interface elements at the output side composed of a plurality of outputs;

providing at least one stream of information words, incoming to the switching network, with auxiliary information composed of first and second sub-information, whereby auxiliary information is provided for each information word at the interface elements of the input side composed of a plurality of inputs, the first sub-information indicative of a source number that is characteristic of a respective input of the interface elements of the input side;

forming the second sub-information from the information words and the first sub-information, whereby the information words together with the auxiliary information are duplicated and forwarded via a respective switching network level to selected interface elements of the output side;

again forming, in a first evaluation of the information words and the first sub-information received at the selected interface elements of the output side, a second sub-information in the selected interface elements of the output side, whereby newly formed second sub-information is compared to the second sub-information received at the selected interface elements of the output side, and implementing in a second evaluation a bit-by-bit comparison of the information words and the first sub-information received at the selected interface elements of the output side; and forwarding by means of the interface elements of the output side in cooperation with a central control platform and dependent on a result of the first and second evaluations, one of the information words transmitted in parallel to the destination subscriber.

2. The method according to claim 1, wherein the second sub-information is a check bit acquired from a binary checksum of a respective information word and associated first sub-information.

3. The method according to claim 1, wherein the transmission through a switching network level having better statistical quality data than other switching network levels occurs in information-word-oriented fashion when the combination of the first and second evaluations does not supply any error allocation.

4. The method according to claim 1, wherein the method further comprises storing a source number per call setup in the interface elements of the output side by the central control platform via a communication channel and, given a non-coincidence of source numbers transmitted via each switching network level in a second evaluation, the interface elements of the output side, using the stored source numbers, forward the stream of information words in a direction of the destination subscriber whose transmitted source number is identical to that stored in the interface elements of the output side.

5. The method according to claim 4, wherein the method further comprises, given a non-coincidence of the source numbers identified in the second evaluation, sending a message from the interface elements of the output side to the central control platform which initiates the central control platform to use internally stored source numbers belonging to the stream of information words as an additional criterion to determine which of two transmitted non-coincident streams of information words respective source numbers is correct; and communicating a result of the determination to the interface elements of the output side for a selection of a correct stream of information words.

6. The method according to claim 5, wherein the method further comprises, given re-initialization of the central control platform after a total outage, regenerating switching-oriented connection data during an initialization process from the source numbers stored in the selected interface elements of the output side.

7. The method according to claim 4, wherein the method further comprises cyclically transmitting source/destination relations stored in the central control platform that define setting data of the switching network to the interface elements of the output side as the source numbers via a communication channel by a transmission procedure; and using the source numbers for deciding in case of a non-coincidence of the source numbers identified in the second evaluation as to which of two non-coincidence source numbers is correct and, thus, which stream of information words is forwarded in a direction to the destination subscriber as soon as a source number deposited by the communication channel coincides with one of those transmitted in each of the switching network levels.

8. The method according to claim 7, wherein the method further comprises, given re-initialization of the central control platform after a total outage, regenerating switching-oriented connection data during an initialization process from the source numbers stored in the selected interface elements of the output side.

9. The method according to claim 4, wherein the method further comprises, given re-initialization of the central control platform after a total outage, regenerating switching-oriented connection data during an initialization process from the source numbers stored in the selected interface elements of the output side.

10. The method according to claim 1, wherein in case of asynchronously set switching network levels, the second evaluation is implemented only after a predetermined long protective time has elapsed.

11. A method for on-line monitoring and bit error reduction for connections in communication systems having a switching network composed of at least two switching network levels, the switching network having an input side and an output side that is coupled to a destination subscriber, the method comprising the steps of:

providing interface elements of the input aide composed of a plurality of inputs and providing interface elements of the output side composed of a plurality of outputs;

providing at least one stream of information words, incoming to the switching network, with auxiliary information composed of first and second sub-information, whereby auxiliary information is provided for each information word at the interface elements of the input side composed of a plurality of inputs, the first sub-information indicative of a source number that is characteristic of a respective input of the interface elements of the input side;

forming the second sub-information from the information words and the first sub-information, whereby the information words together with the auxiliary information are duplicated and forwarded via a respective switching network level to selected interface elements of the output side;

again forming, in a first evaluation of the information words and the first sub-information received at the selected interface elements of the output side, a second sub-information in the selected interface elements of the output side, whereby newly formed second sub-information is compared to the second sub-information received at the selected interface elements of the output side, and implementing in a second evaluation a bit-by-bit comparison of the information words and the first sub-information received at the selected interface elements of the output side;

forwarding, by means of the interface elements of the output side in cooperation with a central control platform and dependent on a result of the first and second evaluations, one of the information words transmitted in parallel to the destination subscriber; and storing a source number per call setup in the interface elements of the output side by the central control platform via a communication channel, wherein given a non-coincidence of source numbers transmitted via each switching network level in the second evaluation, the interface elements of the output side, using the stored source numbers, forward the stream of information words in a direction of the destination subscriber whose transmitted source number is identical to that stored in the interface elements of the output side.

12. The method according to claim 11, wherein the second sub-information is a check bit acquired from a binary checksum of a respective information word and associated first sub-information.

13. The method according to claim 11, wherein the transmission through a switching network level having better statistical quality data than other switching network levels occurs in information-word-oriented fashion when the combination of the first and second evaluations does not supply any error allocation.

14. The method according to claim 11, wherein in case of asynchronously set switching network levels, the second evaluation is implemented only after a predetermined long protective time has elapsed.

15. The method according to claim 11, wherein the method further comprises, given re-initialization of the central control platform after a total outage, regenerating switching-oriented connection data during an initialization process from the source numbers stored in the selected interface elements of the output side.

16. A method for on-line monitoring and bit error reduction for through-connected connections in communication systems having a switching network composed of at least two switching network levels, the switching network having an input side and an output side that is coupled to a destination subscriber, the method comprising the steps of:

providing interface elements of the input side composed of a plurality of inputs and providing interface elements of the output side composed of a plurality of outputs;

providing at least one stream of information words, incoming to the switching network, with auxiliary information composed of first and second sub-information, whereby auxiliary information is provided for each information word at the interface elements of the input side composed of a plurality of inputs, the first sub-information indicative of a source number that is characteristic of a respective input of the interface elements of the input side;

forming the second sub-information from the information words and the first sub-information, whereby the information words together with the auxiliary information is duplicated and forwarded via a respective switching network level to selected interface elements of the output side;

again forming, in a first evaluation of the information words and the first sub-information received at the selected interface elements of the output side, a second sub-information in the selected interface elements of the output side, whereby newly formed second sub-information is compared to the second sub-information received at the selected interface elements of the output side, and implementing in a second evaluation a bit-by-bit comparison of the information words and the first sub-information received at the selected interface elements of the output side;

forwarding, by means of the interface elements of the output side in cooperation with a central control platform and dependent on a result of the first and second evaluations, one of the information words transmitted in parallel to the destination subscriber;

storing a source number per call setup in the interface elements of the output side by the central control platform via a communication channel, wherein given a non-coincidence of source numbers transmitted via each switching network level in the second evaluation, the interface elements of the output side, using the stored source numbers, forward the stream of information words in a direction of the destination subscriber whose transmitted source number is identical to that stored in the interface elements of the output side;

given a non-coincidence of the source numbers identified in the second evaluation, sending a message from the interface elements of the output side to the central control platform which initiates the central control platform to use internally stored source numbers belonging to the stream of information words as an additional criterion to determine which of two transmitted non-coincident streams of information words respective source numbers is correct; and communicating a result of the determination to the interface elements of the output side for a selection of a correct stream of information words.

17. The method according to claim 16, wherein the second sub-information is a check bit acquired from a binary checksum of a respective information word and associated first sub-information.

18. The method according to claim 16, wherein the transmission through a switching network level having better statistical quality data than other switching network levels occurs in information-word-oriented fashion when the combination of the first and second evaluations does not supply any error allocation.

19. The method according to claim 16, wherein in case of asynchronously set switching network levels, the second evaluation is implemented only after a predetermined long protective time has elapsed.

20. The method according to claim 16, wherein the method further comprises, given re-initialization of the central control platform after a total outage, regenerating switching-oriented connection data during an initialization process from the source numbers stored in the selected interface elements of the output side.

* * * * *